(12) United States Patent
Wang

(10) Patent No.: US 9,928,364 B2
(45) Date of Patent: Mar. 27, 2018

(54) DETECTING MALICIOUS FILES

(71) Applicant: Alibaba Group Holding Limited, George Town (KY)

(72) Inventor: Zhen Wang, Hangzhou (CN)

(73) Assignee: Alibaba Group Holding Limited (KY)

( * ) Notice: Subject to any disclaimer, the term of this patent is extended or adjusted under 35 U.S.C. 154(b) by 129 days.

(21) Appl. No.: 15/149,938

(22) Filed: May 9, 2016

(65) Prior Publication Data

US 2016/0342787 A1 Nov. 24, 2016

(30) Foreign Application Priority Data

May 20, 2015 (CN) .......................... 2015 1 0260757

(51) Int. Cl.
*G06F 21/53* (2013.01)
*G06F 21/55* (2013.01)
*G06F 21/56* (2013.01)
*G06K 9/00* (2006.01)

(52) U.S. Cl.
CPC ............ *G06F 21/53* (2013.01); *G06F 21/552* (2013.01); *G06F 21/566* (2013.01); *G06K 9/00536* (2013.01)

(58) Field of Classification Search
None
See application file for complete search history.

(56) References Cited

U.S. PATENT DOCUMENTS

| 8,856,542 B2 | 10/2014 | Tatarinov | |
| 9,038,178 B1 * | 5/2015 | Lin | H04L 63/1416 709/224 |
| 2006/0101264 A1 * | 5/2006 | Costea | G06F 21/564 713/165 |
| 2007/0250930 A1 | 10/2007 | Aziz | |
| 2008/0016339 A1 | 1/2008 | Shukla | |
| 2008/0016568 A1 | 1/2008 | Szor | |
| 2009/0199297 A1 | 8/2009 | Jarrett | |
| 2011/0258450 A1 | 10/2011 | Tian | |

(Continued)

FOREIGN PATENT DOCUMENTS

| CN | 102724176 A | 10/2012 |
| CN | 103368973 A | 10/2013 |

*Primary Examiner* — Venkat Perungavoor
(74) *Attorney, Agent, or Firm* — Van Pelt, Yi & James LLP

(57) ABSTRACT

Detecting malicious files is disclosed, including: receiving a file checking task, wherein the file checking task comprises a storage address of a candidate file and basic information associated with executing the candidate file; sending the file checking task to a detection device, wherein the file checking task causes the detection device to: use the storage address to acquire the candidate file from a file server; execute the candidate file based at least in part on the basic information associated with the candidate file; monitor the execution of the candidate file; and generate a monitored action record corresponding to the execution of the candidate file; and receiving the monitored action record from the detection device; determining a set of actions included in the monitored action record that matches one or more action types included in a preset malicious action set; and determining whether the candidate file is a malicious file based at least in part on the determined set of actions.

15 Claims, 18 Drawing Sheets

(56) References Cited

U.S. PATENT DOCUMENTS

| | | |
|---|---|---|
| 2012/0137340 A1* | 5/2012 | Jakobsson ............. G06F 21/316 726/1 |
| 2012/0192273 A1 | 7/2012 | Turbin |
| 2012/0304244 A1 | 11/2012 | Xie |
| 2013/0097706 A1 | 4/2013 | Titonis |
| 2013/0227303 A1 | 8/2013 | Kadatch et al. |
| 2013/0283378 A1* | 10/2013 | Costigan ................. G06F 21/55 726/23 |
| 2014/0013434 A1* | 1/2014 | Ranum ................. H04L 63/145 726/24 |
| 2014/0053266 A1 | 2/2014 | Wang |
| 2014/0068774 A1 | 3/2014 | Nie |
| 2014/0090061 A1 | 3/2014 | Avasarala |
| 2014/0165203 A1* | 6/2014 | Friedrichs ............... G06F 21/56 726/24 |
| 2014/0215617 A1 | 7/2014 | Smith |
| 2014/0237590 A1 | 8/2014 | Shua |
| 2014/0237595 A1* | 8/2014 | Sridhara ............ H04L 63/1408 726/23 |
| 2014/0317745 A1 | 10/2014 | Kolbitsch |
| 2015/0089647 A1 | 3/2015 | Palumbo |
| 2015/0242626 A1* | 8/2015 | Wang .................... G06F 21/561 726/23 |
| 2015/0286820 A1* | 10/2015 | Sridhara ............... G06F 21/566 726/23 |

* cited by examiner

1500

1700

DETECTING MALICIOUS FILES

CROSS REFERENCE TO OTHER APPLICATIONS

This application claims priority to People's Republic of China Patent Application No. 201510260757.9 entitled A METHOD, A DEVICE AND A SYSTEM FOR CHECKING FILES, filed May 20, 2015 which is incorporated herein by reference for all purposes.

FIELD OF THE INVENTION

The present invention relates to a field of malware detection. Specifically, the present invention relates to techniques for checking files for potential maliciousness.

BACKGROUND OF THE INVENTION

As the Internet develops, people have ever higher security requirements for files on the Internet. At present, the majority of file checking systems (e.g., anti-virus systems) performs detection of malware by comparing files against signatures of known malware and potentially deleting identified malware.

However, file checking systems that make use of signature-based file checking are not very effective as soon as a virus file changes slightly or when faced with the latest viruses.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of detecting malicious files are described herein. A file checking task is received. The file checking task includes at least a storage address of a candidate file and basic information associated with executing the candidate file. The candidate file is obtained based at least in part on the storage address of a candidate file. The candidate file is executed (e.g., by a lightweight virtual machine) based on the basic information, and a monitored action record corresponding to the executed candidate file is generated. Actions of the monitored action record that are found in a preset malicious action set are determined to be malicious and whether the candidate file comprises a malicious file is determined based at least in part on the presence of the malicious actions.

Figure 1:
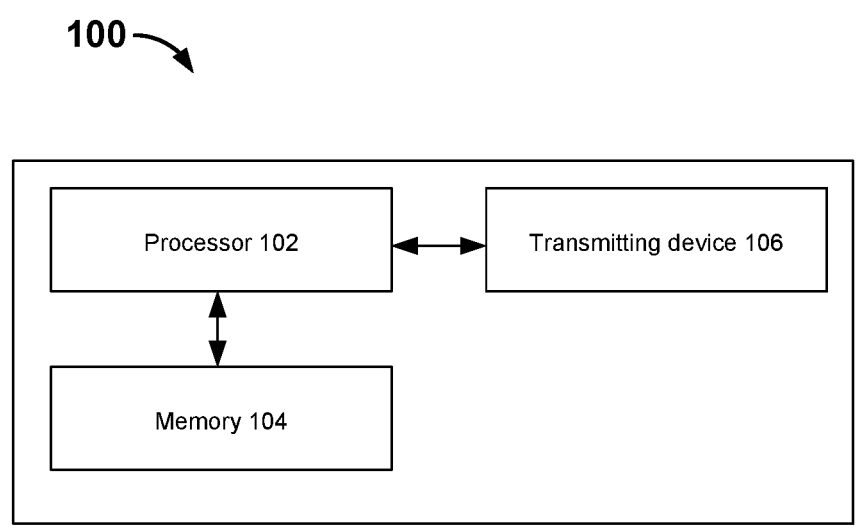
FIG. 1 is a diagram showing an embodiment of a system for detecting malicious files.

FIG. 1 is a diagram showing an embodiment of a system for detecting malicious files. Examples of system 100 may comprise a mobile terminal, a computer terminal, a laptop device, a tablet device, or any other computing device. As shown in FIG. 1, system 100 comprises processor 102 (though system 100 may include additional processors that are not shown in the diagram), memory 104 for storing data, and transmission device 106 for communication functions. For example, processor 102 may include but is not limited to processing devices such as microprocessor microcontroller units (MCUs) or programmable logic device FPGAs. Persons with ordinary skill in the art may understand that the structures shown in FIG. 1 are merely schematic and do not limit the structures of the electronic device. For example, system 100 may further comprise more or fewer components than shown in FIG. 1 or may have a configuration that differs from the one shown in FIG. 1.

Memory 104 is configured to store application programs and modules of the application software. In various embodiments, memory 104 is configured to store program instructions and/or one or more modules that perform detection of malicious files, described herein. By executing the software programs and modules stored in memory 104, processor 102 can execute the various function applications and data processing, i.e., implement the detection of malicious files as described herein. Memory 104 may comprise high-speed random access memory. Memory 104 may further comprise non-volatile memory, such as one or more magnetic storage devices, flash memory, or other non-volatile solid-state memory. In some embodiments, memory 104 may further comprise memory that is remotely disposed relative to processor 102. Such remote memory may be connected to system 100 via a network. Examples of the network comprise but are not limited to the Internet, corporate intranets, local area networks, mobile communication networks, and combinations thereof.

Transmitting device 106 is configured to receive or send data via a network. Specific examples of the network may comprise wireless networks provided by communication suppliers for system 100. In some embodiments, transmitting device 106 comprises a network interface controller (NIC) such as an Ethernet adapter, which is configured to connect to other devices and various networks such as the Internet. In an example, transmitting device 106 may be a radio frequency (RF) module, which is configured to communicate with the Internet wirelessly.

In some embodiments, system 100 can be configured to perform the functionalities of a file checking device, a detection device, or both. Processes that can be performed by one or both of the file checking device and detection device are described below.

Figure 2:
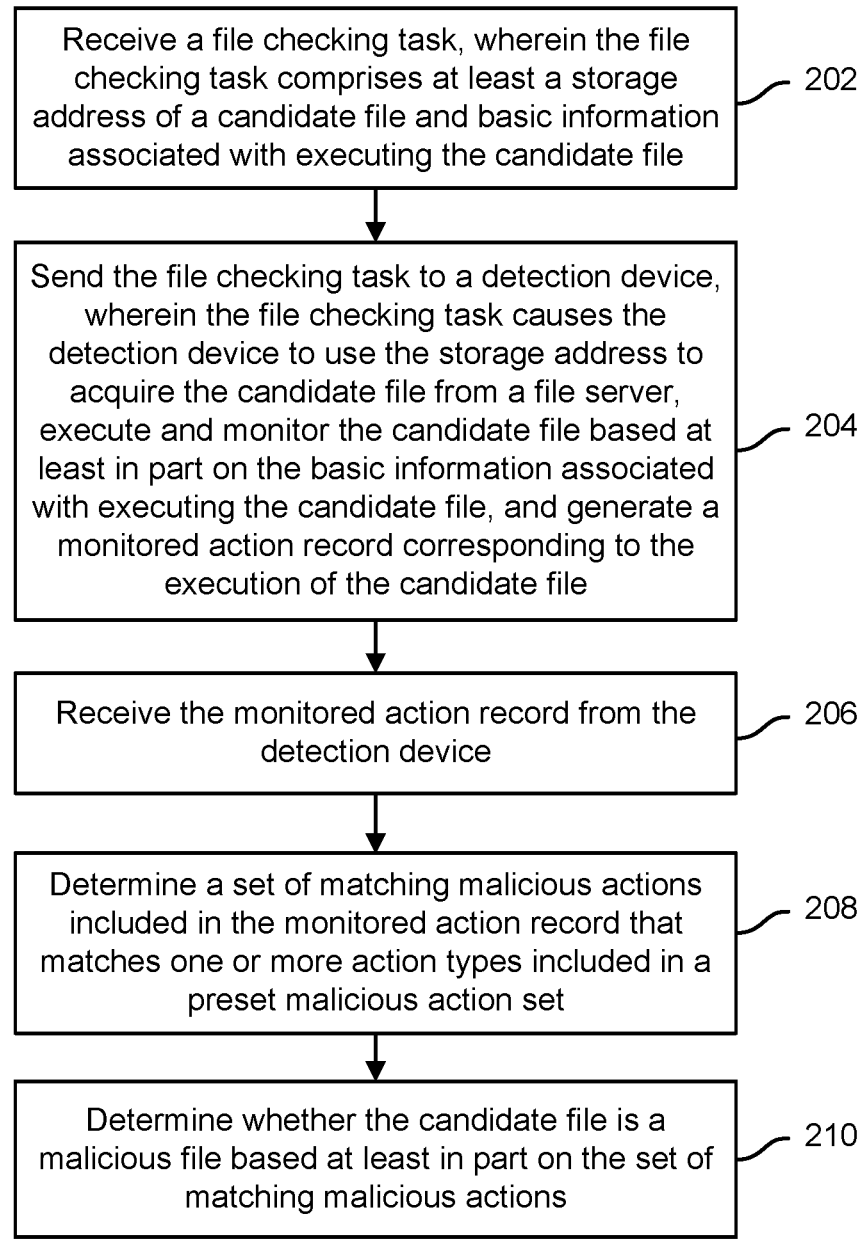
FIG. 2 is a flow diagram showing an embodiment of a process for detecting malicious files.

FIG. 2 is a flow diagram showing an embodiment of a process for detecting malicious files. In some embodiments, process 200 is implemented at a system such as system 100 of FIG. 1. In some embodiments, process 200 can be implemented at a file checking device, which can be implemented using a system such as system 100 of FIG. 1.

At 202, a file checking task is received, wherein the file checking task comprises at least a storage address of a candidate file to be checked and basic information associated with executing the candidate file. The candidate file can be an email attachment, a link on a webpage, a downloaded file, for example, and can be extracted before the content containing the candidate file reaches the intended user (e.g., before the email is delivered to the user, the webpage is rendered in the user's browser, before download is persistently stored at the device, etc.).

In some embodiments, the candidate file's storage address refers to the address (e.g., tfsname) where the candidate file is stored on a file server. For example, the storage address may identify a particular file server and/or a particular location within the file server. In some embodiments, the basic information associated with executing the candidate file may include one or more of the following: a filename of the candidate file, an application operating system (e.g., Windows or Linux) in which the candidate file is to be executed, a value indicating whether the operating system is 32-bit, a message digest algorithm (MD5) value of the candidate file, a file size of the candidate file, an SHA1 (secure hash algorithm) value of the candidate file, an SHA256 value of the candidate file, a time of submission of the candidate file, an origin of submission, a file type of the candidate file (e.g., indicating whether it is "tfs" or "url" or "oss" or other), a byte array, and/or other appropriate values.

In some embodiments, the file checking task can be sent to a file checking device from a client (e.g., a software executing at a computer/device).

At 204, the file checking task is sent to a detection device, wherein the file checking task causes the detection device to use the storage address to acquire the candidate file from a file server, execute the candidate file based at least in part on the basic information associated with executing the candidate file, monitor the execution, and generate a monitored action record corresponding to the execution of the candidate file.

In some embodiments, a file checking task including the storage address of the candidate file and basic information associated with executing the candidate file is received at a file checking device at step 202 and the file checking device can send the candidate file to a corresponding detection device. In some embodiments, the file checking device and the detection device are separate devices. For example, one reason for the file checking device to send a file checking task to a separate detection device is to offload the computationally-expensive operation of performing the file checking task to another system, namely the detection device. However, in some embodiments, the file checking device and the detection device are part of the same device.

After the detection device receives the file checking task, it can use the storage address to acquire the candidate file from a file server, execute and monitor the candidate file on the basis of the basic information for executing the candidate file, and generate a monitored action record corresponding to the execution of the candidate file. The monitored action record includes the one or more actions that were performed by the executed candidate file during its execution. In some embodiments, a virtual machine executing at the detection device is configured to execute the candidate file and record each action that is performed by the executing candidate file.

More than one file checking task can be sent to the detection device at once. As such, the detection device can receive a batch of multiple file checking tasks at once and simultaneously execute the multiple candidate files and generate monitored action records corresponding to each executed candidate file. Process 700 of FIG. 7, below, describes an example process of executing and monitoring a candidate file.

In various embodiments, a "monitored action record" comprises one or more instances of one or more types of actions that are performed by the candidate file when it was executed in a virtualized environment.

For example, the monitored action record may record the executed candidate file's invocations of some sensitive functions (e.g., functions which are often triggered and invoked by malicious files) and the specific parameters that were used by the file in the invocations. One example of such a sensitive function is a file creation function, such as the NtCreateFile function provided by Windows® library, which is used to create a new file. The detection device can monitor the following actions, for example: if this function was executed, whether the executed function created a new file, whether the created new file gives write permission, the full path of the newly created file, and other such information. Another example of a sensitive function is a file information configuration function, such as the NtSetinformationFile function, which is used to change the information associated with a file. The function is very frequently invoked and the detection device monitors whether an existing file is modified by this function such as if the existing file experiences a change of filename, a modification of file attributes, or a file deletion.

At 206, the monitored action record is received from the detection device.

After the detection device generates a monitored action record, it can send the monitored action record to the file checking device performing process 200.

At 208, a set of actions included in the monitored action record that matches one or more action types in a preset malicious action set is determined.

Whether the candidate file is a malicious file is determined by comparing the actions of the monitored action record to a preset malicious action set. If one or more malicious actions are present in the candidate file, the candidate file can be determined to be a malicious file, as will be described in further detail below. In some embodiments, after a candidate file is determined to be a malicious file, the candidate file is stored in a storage medium (e.g., quarantined to be handled and further reviewed later). In some embodiments, after a candidate file is determined to be a malicious file, the candidate file is deleted. In some embodiments, after a candidate file is determined to be a malicious file, an alert is sent to a user to inform that user that the candidate file is potentially malicious. In some embodiments, after a candidate file is determined to be a malicious file, a signature is generated based on the candidate file and the signature is compared against future candidate files to determine whether they match the signature and are therefore malicious.

In some embodiments, the preset malicious action set is obtained prior to an execution of process 200 through model training. Process 300 of FIG. 3, below, describes an example process of generating the preset malicious action set.

As described in various embodiments, the techniques of detecting malicious files do not rely on comparing a candidate file to signatures. Instead, the candidate file is executed in a virtualized environment, its actions are monitored during the execution, and the monitored actions are compared against those in a preset malicious action set. As such, various embodiments described herein are able to perform finer-grained, higher precision, and more flexible file checking by performing file checks that entail malicious-action comparisons. Whereas signature-based techniques of malware detection suffer when there are not exact matches between malicious files and signatures, various embodiments as described herein are able to detect files that are malicious so long as the actions they perform during execution sufficiently match those in a preset malicious action set, as will be described in detail below.

By comparing each of the monitored actions in the monitored action record to the preset malicious action set, each monitored action can be classified as being not indicative of malicious behavior or indicative of malicious behavior. Each action type included in the preset malicious action set is associated with an action that is classified (e.g., presumed) to be indicative of malicious behavior. In various embodiments, each action included in the monitored action set is compared against the action types of the preset malicious action set to determine a match. If a match can be found in the preset malicious action set, then the action is assumed to be indicative of a malicious behavior and is also included in a determined set of actions. Otherwise, if a match cannot be found in the preset malicious action set, then the action is assumed to not be indicative of a malicious behavior and not included in the determined set of actions. As such, the determined set of actions comprises one or more actions from the monitored action record that match malicious action types in the preset malicious action set. The determined set of actions may include one or more instances of an action associated with an action type that matches an action type in the preset malicious action set. For example, an instance of a file creation action from the monitored action record matches a file creation action type in the preset malicious action set and is therefore included in the determined set of actions. In another example, an instance of a file size checking action from the monitored action record does not match any action types in the preset malicious action set and is therefore not included in the determined set of actions.

At 210, whether the candidate file is a malicious file is determined based at least in part on the determined set of actions.

In various embodiments, a malicious file comprises a program that can execute malicious tasks on computer systems and/or achieve control by subverting normal software processes. In some embodiments, a malicious file is also sometimes referred to as malicious software. Typical malicious files include viruses, Trojan horses, worms, remote control software, and keyboard recording software.

Whether the candidate file is a malicious file or not can be determined based on the determined set of actions.

In some embodiments, the determination of whether the candidate file is a malicious file is based on determining the quantity of malicious actions that is in the determined set of actions, determining whether the quantity of malicious actions is greater than a preset malicious action threshold value, and determining that the candidate file is a malicious file if the quantity of malicious actions is greater than the preset malicious action threshold value.

In some embodiments, the preset malicious action threshold value may refer to the total number of malicious actions, across one or more action types, which are found in the determined set of actions. In some embodiments, the preset malicious action threshold value may refer to the total number of unique malicious action types, which are found in the determined set of actions. Various embodiments as described herein do not limit the definition of the preset malicious action threshold value. In various embodiments, the preset malicious action threshold value may be set in advance by a system administrator. Then, whether the quantity of malicious actions is greater than the preset malicious action threshold value may be determined. If the quantity of malicious actions is greater than the preset malicious action threshold value, the candidate file is determined to be a malicious file. Otherwise, if the quantity of malicious actions is not greater than the preset malicious action threshold value, the candidate file is determined to not be a malicious file.

Figure 3:
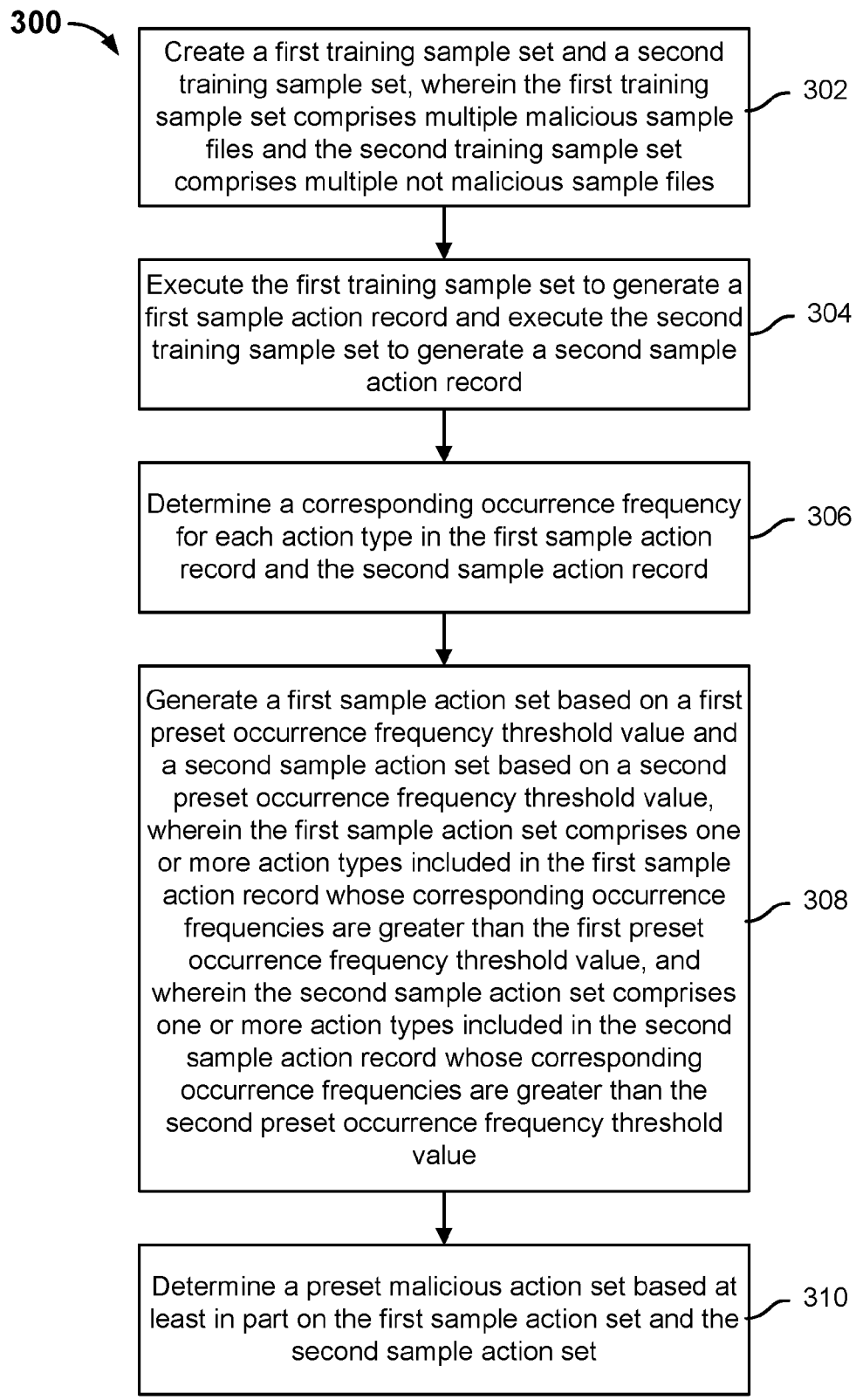
FIG. 3 is a flow diagram showing an embodiment of a process for generating a preset malicious action set.

FIG. 3 is a flow diagram showing an embodiment of a process for generating a preset malicious action set. In some embodiments, process 300 is implemented at a system such as system 100 of FIG. 1. In some embodiments, process 300 can be implemented at a file checking device, which can be implemented using a system such as system 100 of FIG. 1.

Process 300 is an example process of generating a preset malicious action set. In some embodiments, process 300 can be implemented prior to an execution of step 208 of process 200 of FIG. 2.

At 302, a first training sample set and a second training sample set are created, wherein the first training sample set comprises multiple malicious sample files and the second training sample set comprises multiple not malicious sample files. The training sample set can be collected during normal operation of a system such as an email system, a web services system, etc.

At 304, the first training sample set is executed to generate a first sample action record and the second training sample set is executed to generate a second sample action record.

A first sample action record is obtained by executing each of the malicious sample files that are included in the first training sample set and a second sample action record is obtained by executing each of the not malicious sample files that are included in the second training sample set. The first sample action record and the second sample action record may be generated by a detection device using a corresponding virtualized environment, in some embodiments. In the event that the first training sample set includes multiple malicious sample files and/or the second training sample set includes multiple not malicious sample files, the detection device can simultaneously execute these multiple malicious sample files and multiple not malicious sample files and generate a corresponding first sample action record and a second sample action record. In various embodiments, the first sample action record comprises one or more actions performed by the executed malicious file(s) of the first training sample set and the second sample action record comprises one or more actions performed by the executed not malicious file(s) of the second training sample set.

At 306, a corresponding occurrence frequency is determined for each action type in the first sample action record and the second sample action record.

The executed sample files of the first sample training set and the second sample training set can generate various types of actions. For example, different types of actions may include a deletion of a file, a creation of a file, and a modification of a filename of an existing file. The number of instances of each type of action that is performed by the execution of the malicious file(s) of the first training sample set and the number of instances of each type of action that is performed by the execution of the not malicious file(s) of the second training sample set are referred to as that type of action's occurrence frequency.

At 308, a first sample action set is generated based on a first preset occurrence frequency threshold value and a second sample action set is generated based on a second preset occurrence frequency threshold value, wherein the first sample action set comprises one or more action types included in the first sample action record whose corresponding occurrence frequencies are greater than the first preset occurrence frequency threshold value, and wherein the second sample action set comprises one or more action types included in the second sample action record whose corresponding occurrence frequencies are greater than the second preset occurrence frequency threshold value. In some embodiments, the first preset occurrence frequency threshold value and/or the second preset occurrence frequency threshold value can be determined based on user input and/or empirical determinations.

A first sample action set is screened using the first preset occurrence frequency threshold value and the second sample action set is screened using the second preset occurrence frequency threshold value. Screening the first sample action set comprises comparing the occurrence frequency of each action type from the first sample action record to the first preset occurrence frequency threshold value and selecting to include an action type into a first sample action set in the event that the occurrence frequency of a particular action type from the first sample action record is greater than the first preset occurrence frequency threshold value. Similarly, screening the second sample action set comprises comparing the occurrence frequency of each action type from the second sample action record to the second preset occurrence frequency threshold value and selecting to include an action type into a second sample action set in the event that the occurrence frequency of a particular action type from the second sample action record is greater than the second preset occurrence frequency threshold value.

As a result of step 308, each action type that is included in the first sample action set comprises action types whose corresponding occurrence frequencies are greater than the first preset occurrence frequency threshold value and each action type that is included in the second sample action set comprises action types whose corresponding occurrence frequencies are greater than the second preset occurrence frequency threshold value.

At 310, a preset malicious action set is determined based at least in part on the first sample action set and the second sample action set.

Figure 4:
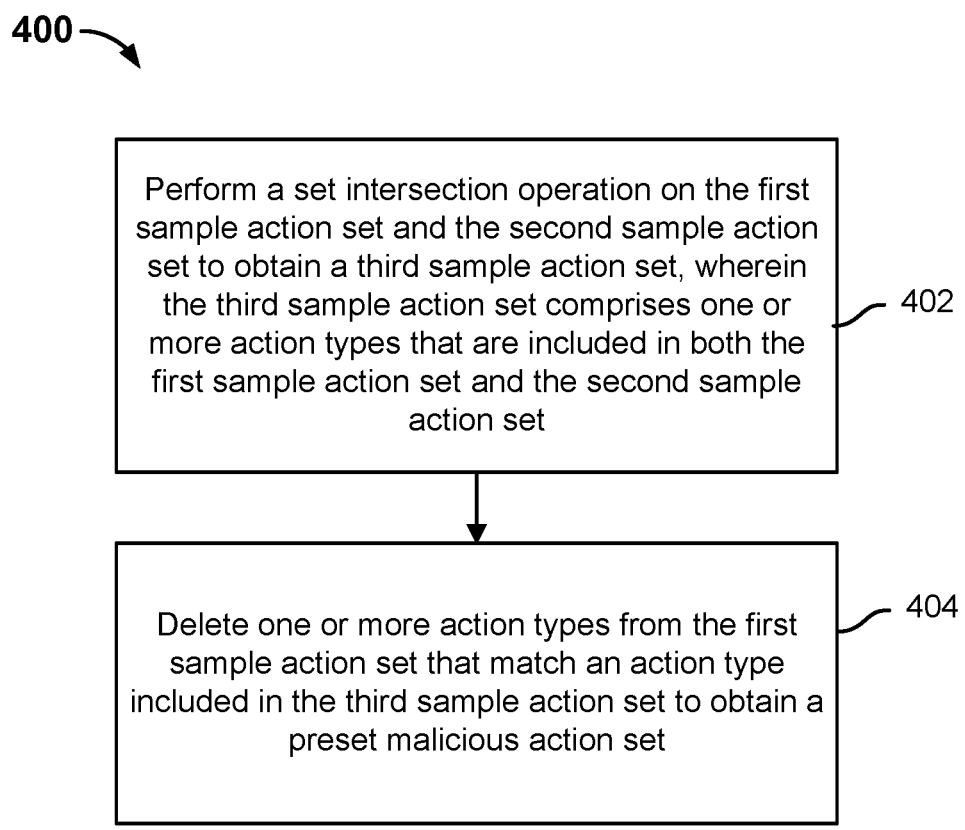
FIG. 4 is a flow diagram showing an embodiment of a process for determining a preset malicious action set based at least in part on a first sample action set and a second sample action set.

FIG. 4 is a flow diagram showing an embodiment of a process for determining a preset malicious action set based at least in part on a first sample action set and a second sample action set. In some embodiments, process 400 is implemented at a system such as system 100 of FIG. 1. In some embodiments, process 400 can be implemented at a file checking device, which can be implemented using a system such as system 100 of FIG. 1.

Process 400 is an example process of determining a preset malicious action set based at least in part on the first sample action set and the second sample action set. In some embodiments, step 310 of process 300 of FIG. 3 can be implemented using process 400. In process 400, "a first sample action set" and "a second sample action set" can be obtained using process 300 of FIG. 3.

At 402, a set intersection operation is performed on the first sample action set and the second sample action set to obtain a third sample action set, wherein the third sample action set comprises one or more action types that are included in both the first sample action set and the second sample action set.

Since an executed malicious file may generate normal, not malicious actions, screening of such not malicious actions in the first sample action set will be performed.

In various embodiments, a set intersection operation on the first sample action set and the second sample action set comprises an operation to determine action types that are common to both the first sample action set and the second sample action set.

For example, the first sample action set contains "action type 1, action type 2, action type 3, action type 4 and action type 5," and the second sample action set contains "action type 2, action type 5, action type 6, and action type 7." Performing a set intersection operation on the first sample action set and the second sample action set results in obtaining a third sample action set, i.e., {action type 1, action type 2, action type 3, action type 4 and action type5}∩{action type 2, action type 5, action type 6, and action type 7}={action type 2, action type 5}, where the third sample action set comprises those action types of the first sample action set that are also found in the second sample action set, i.e., {action type 2, action type 5}.

Put another way, the third sample action set includes action types that are performed by executed malicious files (from the original first training sample set) and action types that are also performed by executed not malicious files (from the original second training sample set).

At 404, one or more action types from the first sample action set that match an action type included in the third sample action set are deleted from the first sample action set to obtain a preset malicious action set.

Because the action types that are found in the third sample action set include action types that are performed by both executed malicious files and action types that are performed by executed not malicious files, they are assumed to be normal action types that are not indicative of malicious behavior. As such, any action from the first sample action set that (is associated with an action type that) matches an action type included in the third sample action set is deleted from the first sample action set. This deletion step removes all the normal, not malicious actions from the first sample action set and retains only the malicious actions in order to avoid false positives. That is, a preset malicious action set is obtained by deleting action types included in the third sample action set from the first sample action set. In some embodiments, the preset malicious action set includes one or more actions of action types that are not found in the third sample action set and are therefore determined to be potentially indicative of malicious behavior.

For example, the first sample action set minus the third sample action set results in the preset malicious action set, i.e., {action type 1, action type 2, action type 3, action type 4, action type 5}−{action type 2, action type 5}={action type 1, action type 3, action type 4}, {action type 1, action type 3, action type 4} (is the final preset malicious action set).

Figure 5:
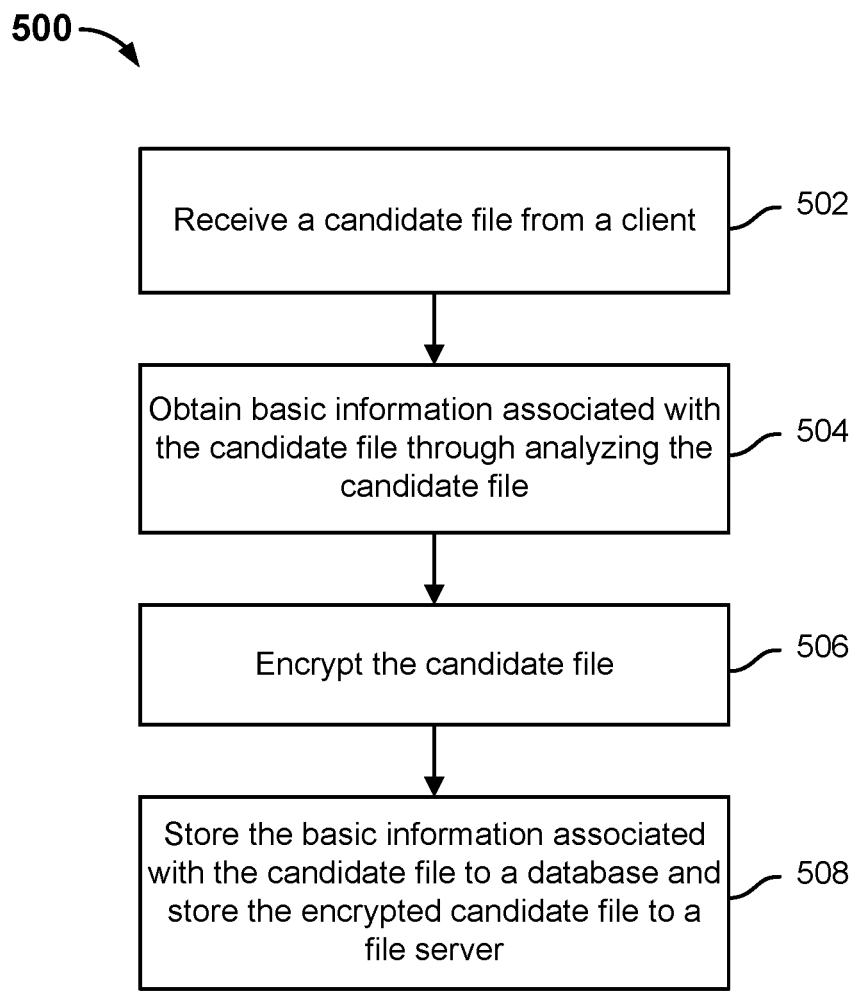
FIG. 5 is a flow diagram showing an embodiment of a process for preprocessing a candidate file.

FIG. 5 is a flow diagram showing an embodiment of a process for preprocessing a candidate file. In some embodiments, process 500 is implemented at a system such as system 100 of FIG. 1. In some embodiments, process 500 can be implemented at a file checking device, which can be implemented using a system such as system 100 of FIG. 1.

Process 500 is an example process of preprocessing the candidate file prior to performing malware detection on it. In some embodiments, process 500 can be implemented with respect to a candidate file that is later processed using process 200 of FIG. 2.

At 502, a candidate file is received from a client.

In various embodiments, a client comprises software installed on a user machine. The client may send a file that the user machine is unable to identify as being known to be malicious or known to not malicious (i.e., the candidate file, which may sometimes also be called a suspicious file) through a network to the file checking device. In some embodiments, the file checking device may be deployed on a cloud server that is remote from the user machine that had initially received the candidate file. After receiving the candidate file sent by the client, the file checking device may implement process 200 of FIG. 2 to determine whether the candidate file is a malicious file.

At 504, basic information associated with the candidate file is obtained through analyzing the candidate file.

After receiving the candidate file sent by a client, the candidate file may perform static analysis of the candidate file in order to obtain basic information of the candidate file. The basic information can be later used to execute the candidate file.

In some embodiments, the basic information associated with executing the candidate file may include one or more of the following: a filename of the candidate file, an application operating system (e.g., Windows or Linux) in which the candidate file is to be executed, a value indicating whether the operating system is 32-bit, a message digest algorithm (MD5) value of the candidate file, a file size of the candidate file, an SHA1 (secure hash algorithm) value of the candidate file, an SHA256 value of the candidate file, a time of submission of the candidate file, an origin of submission, a file type of the candidate file (e.g., indicating whether it is "tfs" or "url" or "oss" or other), a byte array, and/or other appropriate values.

At 506, the candidate file is encrypted.

In some embodiments, a system configuration may require that the candidate file not "touch down" (i.e., that the candidate file is not saved or buffered during processing at a client device that had initially received the candidate file). To prevent a third party or malicious program from stealing or corrupting the candidate file, the candidate file is encrypted with an asymmetrical algorithm. For example, encrypting the candidate file will ensure that the file meets the confidentiality requirements that a user of the client and/or the file checking device has for candidate files.

In an asymmetrical encryption technique, the encryption key and the decryption key are different, and the keys are designed in such a way that it is practically impossible to derive one key from the other.

At 508, the basic information associated with the candidate file is stored to a database and the encrypted candidate file is stored to a file server.

The basic information that is later used to execute the candidate file is stored at a database and the candidate file that has been encrypted is stored to a file server. In embodiments in which process 200 is performed after step 508 is performed, a detection device, after receiving the file checking task, can obtain the candidate file from the file server (e.g., that is identified by a corresponding storage address in the file checking task).

In some embodiments, the generation of a file checking task (e.g., by the file checking device) may be active or passive. For example, file checking tasks may be periodically generated or file checking tasks may be generated upon receiving a trigger instruction from a system administrator.

In some embodiments, prior to executing the candidate file using the basic information for executing the candidate file, the encrypted candidate file is decrypted. In some embodiments, the candidate file is decrypted by the detection device that had obtained the candidate file. In some embodiments, the decrypted candidate file is then executed in a virtualized environment such as a virtual machine executing on an operating system. While the candidate file is executed, in some embodiments, the detection device is configured to monitor one or more actions performed by the candidate file as a result of performing one or more functions. Some examples of such functions include a creating (e.g., NtCreateFile) function, a deleting (e.g., NtDelete) function, an information changing (e.g., NtSetinformationFile) function, a registration table creating (e.g., NtCreateKey) function, and a registration table value setting (e.g., NtSetValueKey) function.

Figure 6:
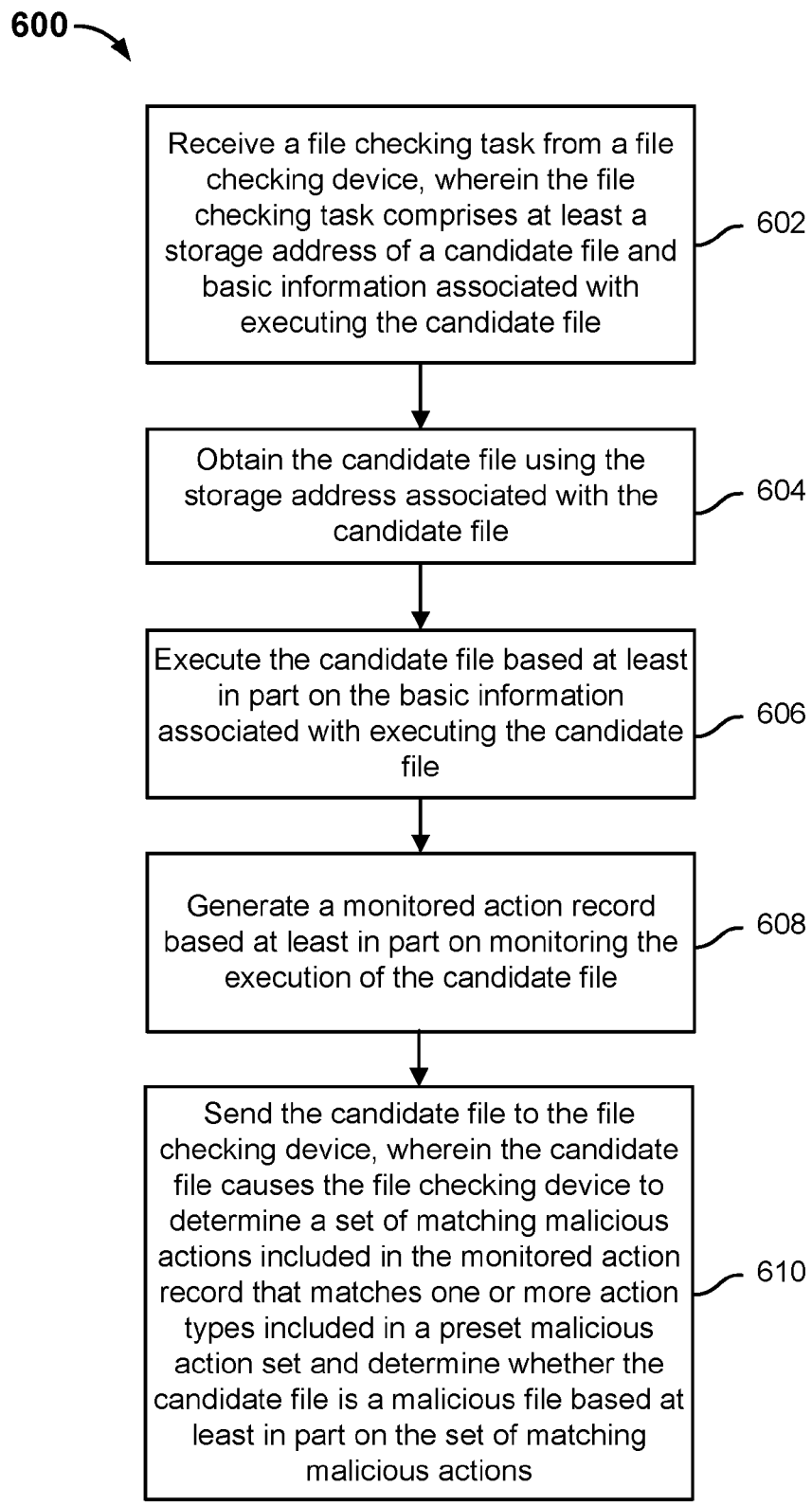
FIG. 6 is a flow diagram showing an embodiment of a process for detecting a malicious file.

FIG. 6 is a flow diagram showing an embodiment of a process for detecting a malicious file. In some embodiments, process 600 is implemented at a system such as system 100 of FIG. 1. In some embodiments, process 600 can be implemented at a detection device, which can be implemented using a system such as system 100 of FIG. 1. In some embodiments, process 600 can be implemented at the same system as the one at which process 200 of FIG. 2 is implemented.

Process 600 is another example process for detecting a malicious file.

At 602, a file checking task is received from a file checking device, wherein the file checking task includes at least the storage address of a candidate file and basic information associated with executing the candidate file.

In some embodiments, the file checking task is received from a file checking device. In some embodiments, the file checking device may be implemented at the same device at which process 600 is performed. In some embodiments, the file checking device may be implemented at a different device than the device at which process 600 is performed. In some embodiments, the file checking task may be generated by the file checking device after a process such as process 500 of FIG. 5 is executed.

At 604, the storage address of the candidate file is used to obtain the candidate file from a file server.

The storage address of the candidate file in the file checking task may be used to obtain the candidate file from a file server and/or a location within the file server that is identified by the storage address.

At 606, the candidate file is executed based at least in part on the basic information associated with executing the candidate file. For example, some basic information associated with the candidate file may include one or more of the following: a filename of the candidate file, an application operating system (e.g., Windows or Linux) in which the candidate file is to be executed, a value indicating whether the operating system is 32-bit, a message digest algorithm (MD5) value of the candidate file, a file size of the candidate file, an SHA1 (secure hash algorithm) value of the candidate file, an SHA256 value of the candidate file, a time of submission of the candidate file, an origin of submission, a file type of the candidate file (e.g., indicating whether it is "tfs" or "url" or "oss" or other), a byte array, and/or other appropriate values. For example, if the application operating system in which the candidate file is to be executed is a 32-bit system, then a virtual machine with a 32-bit operating system will be used to execute the candidate file. Furthermore, for example, certain dynamic link libraries (DLLs) can be run by the virtual machine that is executing the candidate file based on the candidate file's basic information.

In some embodiments, the candidate file is executed in a virtualized environment. Process 700 of FIG. 7, below, describes an example process of executing and monitoring a candidate file.

At 608, a monitored action record is generated based at least in part on monitoring the execution of the candidate file.

While the candidate file is executed, in some embodiments, the detection device is configured to monitor one or more actions performed by the candidate file as a result of performing one or more functions. Some examples of such functions include a file creation function (e.g., NtCreateFile), a file deletion function (e.g., NtDelete), an information changing function (e.g., NtSetinformationFile), a registration table creation function (e.g., NtCreateKey), and a registration table value setting function (e.g., NtSetValueKey).

At 610, the candidate file is sent to the file checking device, wherein receipt of the candidate file causes the file checking device to determine a determined set of actions included in the monitored action record that matches one or more action types included in a preset malicious action set and determine whether the candidate file is a malicious file based at least in part on the determined set of actions.

Figure 7:
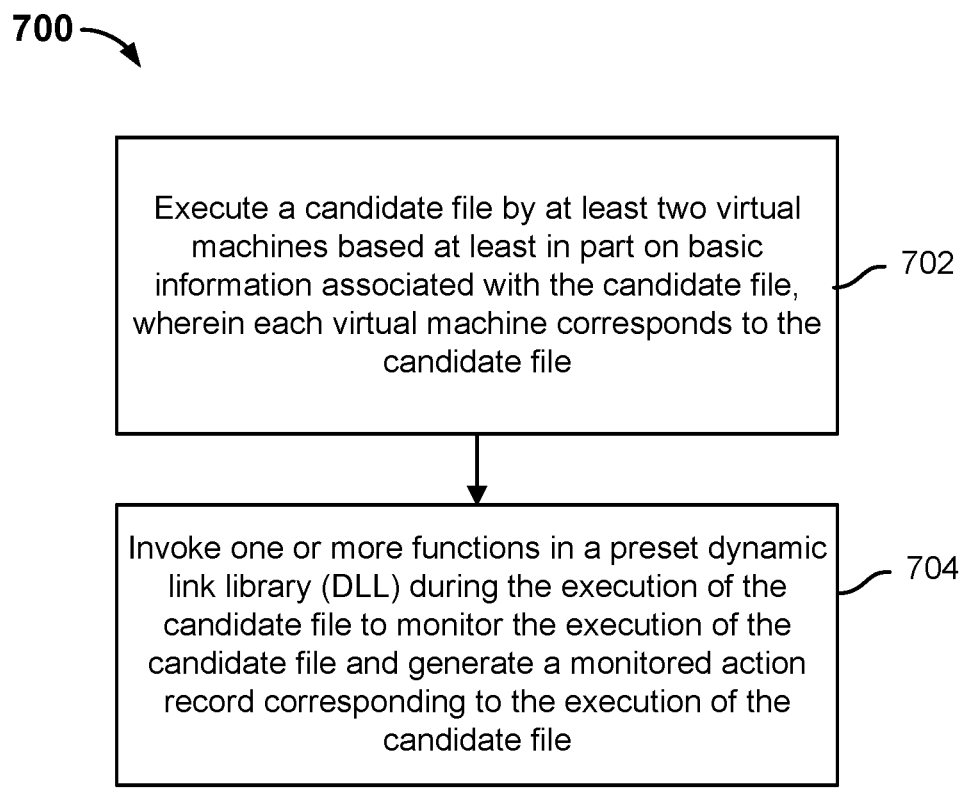
FIG. 7 is a flow diagram showing an embodiment of a process associated with executing and monitoring a candidate file.

FIG. 7 is a flow diagram showing an embodiment of a process associated with executing and monitoring a candidate file. In some embodiments, process 700 is implemented at a system such as system 100 of FIG. 1. In some embodiments, process 700 can be implemented at a detection device, which can be implemented using a system such as system 100 of FIG. 1. In some embodiments, step 606 of process 600 of FIG. 6 can be implemented using process 700.

At 702, a candidate file is executed by at least two virtual machines based at least in part on basic information associated with executing the candidate file, wherein each virtual machine corresponds to the candidate file.

In various embodiments, executing a candidate file using a virtual machine will allow the candidate file to run in an isolated environment, which will contain any negative effects that the execution of the candidate file may cause. In some embodiments, at least two virtual machines are used to execute a candidate file. In some embodiments, the candidate file is initially executed in one virtual machine, while the other one is used as a backup in case the execution at the first virtual machine fails. For example, the second, backup virtual machine can be configured differently than the first virtual machine and could potentially successfully execute the candidate file if the execution fails at the first virtual machine. Preferably, each of the at least two virtual machines that is configured to execute a candidate file based on the basic information of the candidate file comprises a "lightweight" virtual machine. An example of a lightweight virtual machine is "Docker." In various embodiments, a "lightweight" virtual machine comprises a virtual machine that comprises less than all the functions that a regular virtual machine possesses. Regular virtual machines refer to complete computer systems that use software to simulate complete hardware system functions and are executed in fully isolated environments. Lightweight virtual machines refer to ones that do not have complete hardware functions. Lightweight virtual machines generally are applications that are small-volume, easy to control, and execute on the application layer, with output from executing the application in an isolated environment using control system service actions.

One regular virtual machine may check only one sample at a time on one detection device due to the regular virtual machine's resource intensive nature. Therefore, it is inefficient and wasteful to use a regular virtual machine to execute one candidate file. In contrast, because it is less resource intensive to execute a lightweight virtual machine, multiple lightweight virtual machines can be running at a detection device at once and each lightweight virtual machine can execute a candidate file. Using lightweight virtual machines therefore improves file checking efficiency. Running lightweight virtual machines is also less likely to cause serious harm, such as a complete system crash (e.g., blue-screening).

At 704, one or more functions are invoked in a preset dynamic link library (DLL) during the execution of the candidate file to monitor the execution of the candidate file and generate a monitored action record corresponding to the execution of the candidate file.

A preset DLL is injected into each candidate file. In some embodiments such as a virtual machine simulating a machine executing Windows®, during the process of executing each of the candidate files, the API hooking technique supported by the operating system is used to monitor ntdll.dll functions and generate a monitored action record corresponding to the execution of the candidate file. For example, API hooking technology can be used to change the usual execution of the candidate file. For example, whereas the results of the execution would have typically been written to a file to a first drive, API hooking could be implemented to cause the execution results to be written to a file on another drive instead.

Various embodiments do not impose restrictions on the quantity of file checking tasks that can be processed by the detection device. That is, the number of file checking tasks sent to the detection device may be one or more than one. When the detection device receives multiple file checking tasks, it can simultaneously execute multiple candidate files and generate monitored action records corresponding to each candidate file.

Figure 8:
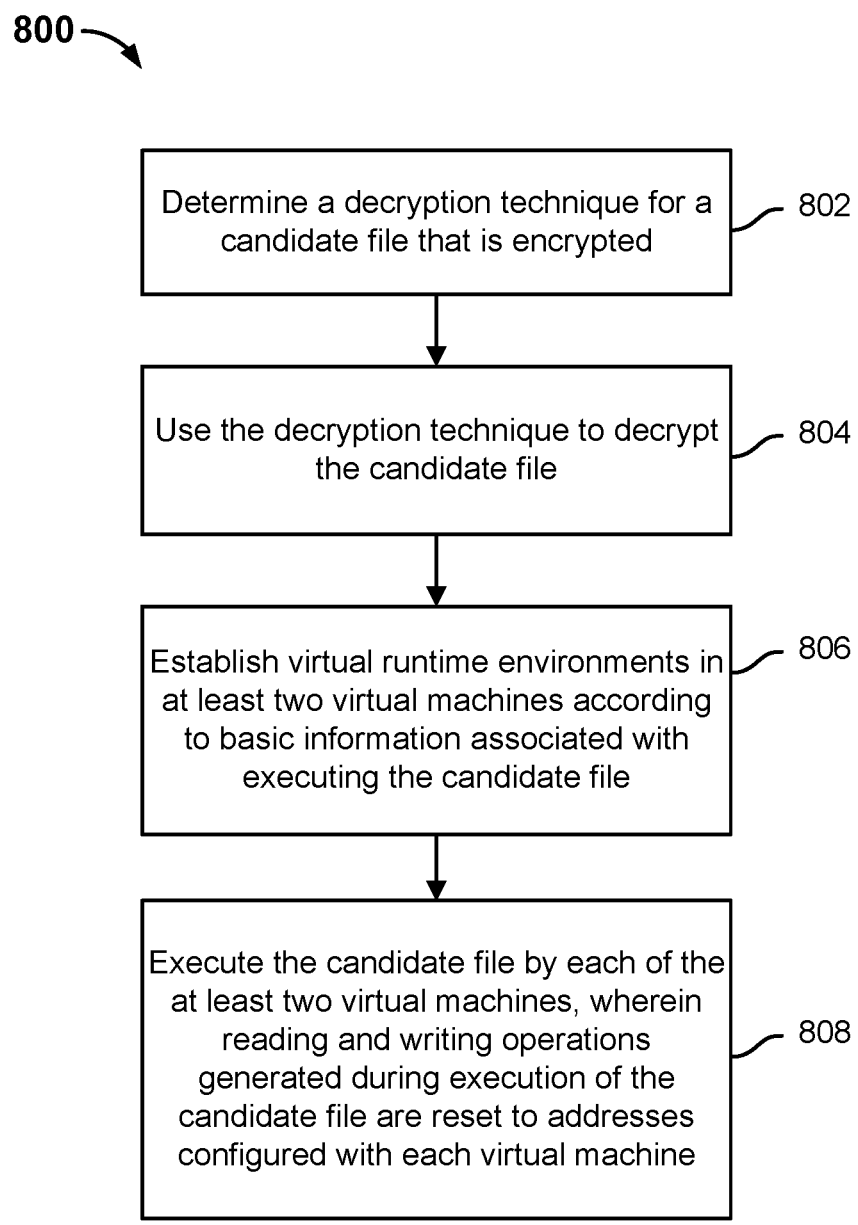
FIG. 8 is a flow diagram showing an embodiment of a process associated with executing a candidate file by at least two virtual machines based at least in part on basic information associated with executing the candidate file.

FIG. 8 is a flow diagram showing an embodiment of a process associated with executing a candidate file by at least two virtual machines based at least in part on basic information associated with executing the candidate file. In some embodiments, process 800 is implemented at a system such as system 100 of FIG. 1. In some embodiments, process 800 can be implemented at a detection device, which can be implemented using a system such as system 100 of FIG. 1. In some embodiments, step 702 of process 700 of FIG. 7 can be implemented using process 800.

At 802, a decryption technique is determined for a candidate file that is encrypted.

As mentioned above, in some embodiments, a system configuration may require that the candidate file not "touch down" (i.e., that the candidate file is not saved or buffered during processing). To prevent a third party or malicious program from stealing or corrupting the candidate file, the candidate file is encrypted with an asymmetrical algorithm. For example, encrypting the candidate file will ensure that the file meets the confidentiality requirements that a user of the client and/or the file checking device has configured for candidate files.

In an asymmetrical encryption technique, the encryption key and the decryption key are different. In other words, it is not possible to derive one of the encryption or decryption keys from the other.

As such, in some embodiments, the candidate files acquired from the file server by the detection device are files encrypted by an asymmetric algorithm. Therefore, the detection device first needs to decrypt the encrypted candidate files. The detection device may acquire a pre-configured decryption algorithm or it can acquire one from a database for storing decryption algorithms. Various embodiments of the present invention impose no restrictions in this regard.

At 804, the decryption technique is used to decrypt the candidate file.

At 806, virtual runtime environments in at least two virtual machines are established according to basic information associated with executing the candidate file.

The basic information associated with executing the candidate files is used to construct virtual runtime environments in at least two virtual machines. For example, a 32-bit or a 64-bit Windows and Linux system platform may be constructed in at least two virtual machines.

At 808, the candidate file is executed by each of the at least two virtual machines, wherein reading and writing operations generated during execution of the candidate file are reset to addresses configured with each virtual machine. For example, the operation results generated during the execution of the candidate file by each virtual machine that is configured to execute the candidate file can be written to a respective location associated with the virtual machine.

Figure 9:
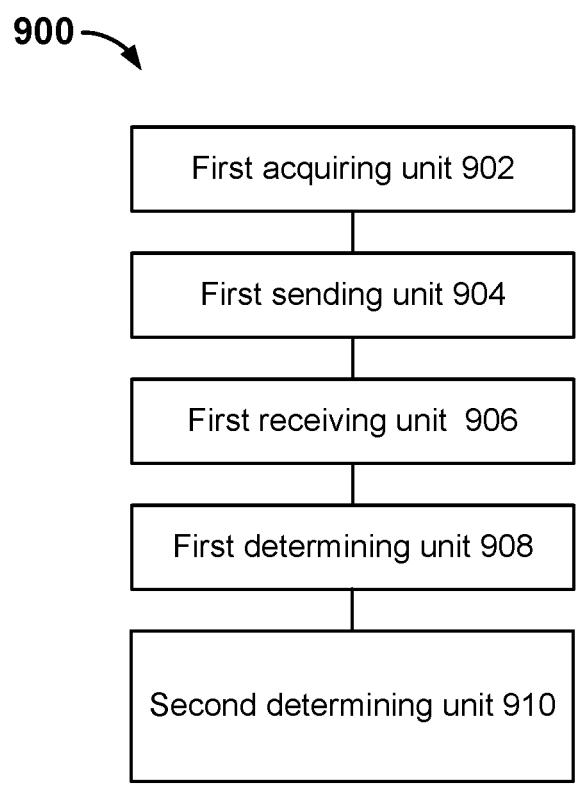
FIG. 9 is a diagram showing an embodiment of a system for detecting malicious files.

FIG. 9 is a diagram showing an embodiment of a system for detecting malicious files. System 900 includes first acquiring unit 902, first sending unit 904, first receiving unit 906, first determining unit 908, and second determining unit 910. In some embodiments, process 200 of FIG. 2 can be implemented on system 900. In some embodiments, system 900 may be implemented at system 100 of FIG. 1.

The units, modules, and submodules can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units, modules, and submodules can be implemented on a single device or distributed across multiple devices. The units, modules, and submodules can be implemented as software, hardware, or both.

First acquiring unit 902 is configured to receive a file checking task. The file checking task includes at least a storage address of a candidate file and basic information associated with executing the candidate file. First sending unit 904 is configured to send the file checking task to a detection device. In response to receiving the file checking task, the detection device is configured to use the storage address to acquire the candidate file from a file server, execute the candidate file based at least in part on the basic information associated with executing the candidate file, monitor the execution of the candidate file, and generate a monitored action record corresponding to the execution of the candidate file. First receiving unit 906 is configured to receive the monitored action record from the detection device. First determining unit 908 is configured to determine a determined set of actions included in the monitored action record that matches one or more action types in a preset malicious action set. Second determining unit 910 is configured to determine whether the candidate file is a malicious file, determined based at least in part on the determined set of actions.

Figure 10:
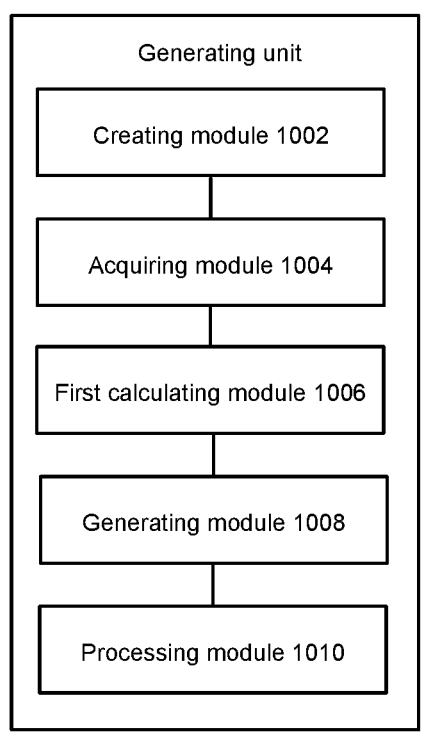
FIG. 10 is a diagram showing an embodiment of a system for generating a preset malicious action set.

FIG. 10 is a diagram showing an embodiment of a system for generating a preset malicious action set. System 1000 includes creating module 1002, acquiring module 1004, first calculating module 1006, generating module 1008, and processing module 1010. In some embodiments, process 300 of FIG. 3 can be implemented on system 1000. In some embodiments, system 1000 may be implemented at system 100 of FIG. 1.

Creating module 1002 is configured to create a first training sample set and a second training sample set. The first training sample set comprises at least one malicious sample file and the second training sample set comprises at least one not malicious sample file. Acquiring module 1004 is configured to execute the first training sample set to generate a first sample action record and to generate the second training sample set to generate a second sample action record. First calculating module 1006 is configured to determine a corresponding occurrence frequency for each action type in the first sample action record and the second sample action record. Generating module 1008 is configured to generate a first sample action set based on a first preset occurrence frequency threshold value and a second sample action set based on a second preset occurrence frequency threshold value. The first sample action set comprises one or more action types included in the first sample action record whose corresponding occurrence frequencies are greater than the first preset occurrence frequency threshold value. The second sample action set comprises one or more action types included in the second sample action record whose corresponding occurrence frequencies are greater than the second preset occurrence frequency threshold value. Processing module 1010 is configured to determine a preset malicious action set based at least in part on the first sample action set and the second sample action set.

Figure 11:
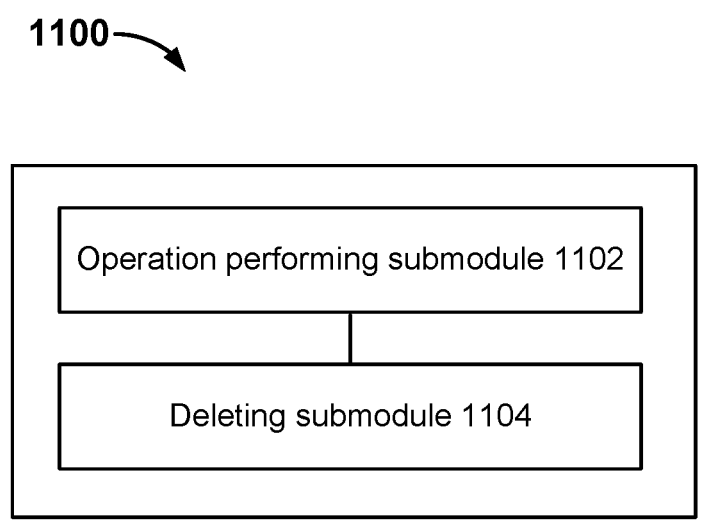
FIG. 11 is a diagram showing an embodiment of a system for generating a preset malicious action set.

FIG. 11 is a diagram showing an embodiment of a system for generating a preset malicious action set. System 1100 includes operation performing submodule 1102 and deleting submodule 1104. In some embodiments, processing module 1010 of FIG. 10 is implemented on a system such as system 1100. In some embodiments, process 400 of FIG. 4 can be implemented on system 1100. In some embodiments, system 1100 may be implemented at system 100 of FIG. 1.

Operation performing submodule 1102 is configured to perform a set intersection on the first sample action set and the second sample action set to obtain a third sample action set. The third sample action set comprises one or more action types that are included in both the first sample action set and the second sample action set. Deleting submodule 1104 is configured to delete one or more action types from the first sample action set that match an action type included in the third sample action set to obtain a preset malicious action set.

Figure 12:
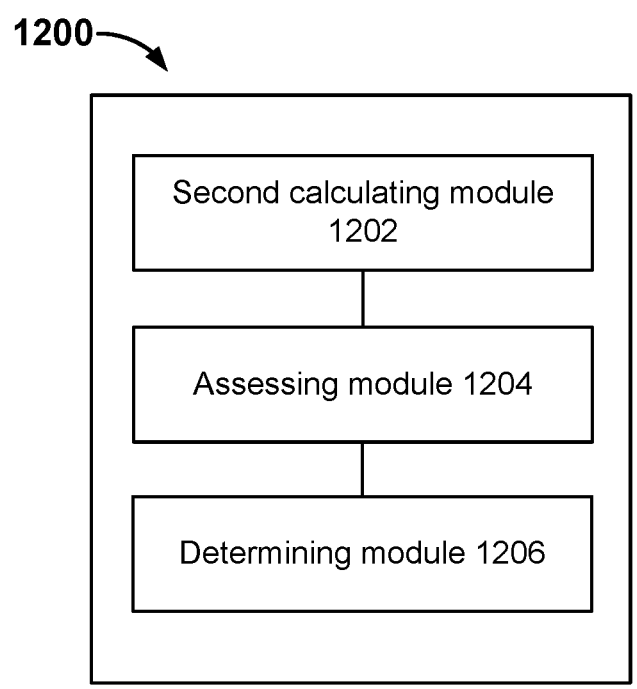
FIG. 12 is a diagram showing an embodiment of a system for determining whether the candidate file is a malicious file determined based at least in part on the determined set of actions.

FIG. 12 is a diagram showing an embodiment of a system for determining whether the candidate file is a malicious file determined based at least in part on the determined set of actions. System 1200 includes second calculating module 1202, assessing module 1204, and determining module 1206. In some embodiments, second determining unit 910 of FIG. 9 is implemented on a system such as system 1200. In some embodiments, system 1200 may be implemented at system 100 of FIG. 1.

Second calculating module 1202 is configured to calculate the quantity of the malicious actions included in a determined set of actions. Assessing module 1204 is configured to determine whether the quantity of the malicious actions is greater than a preset threshold value. The determining module 1206 is configured to determine that the candidate file is a malicious file if the quantity of the malicious actions is greater than the preset malicious action threshold value.

Figure 13:
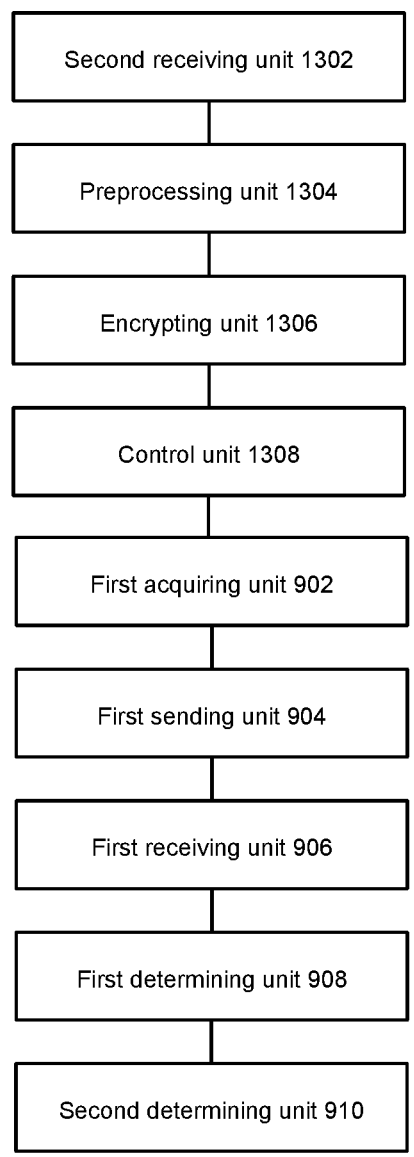
FIG. 13 is a diagram showing an embodiment of a system for detecting malicious files.

FIG. 13 is a diagram showing an embodiment of a system for detecting malicious files. System 1300 includes the components of system 900 of FIG. 9 and additionally, second receiving unit 1302, preprocessing unit 1304, encrypting unit 1306, and control unit 1308. In some embodiments, system 1300 may be implemented at system 100 of FIG. 1.

Second receiving unit 1302 is configured to receive a candidate file from a client. Preprocessing unit 1304 is configured to obtain basic information associated with the candidate file through analyzing the candidate file. Encrypting unit 1306 is configured to encrypt the file. Control unit 1308 is configured to store the basic information associated with the candidate file to a database and store the encrypted candidate file to a file server.

Conventional signature-based file checking is less effective when there are slight changes in malicious files. However, various embodiments as described herein are capable of detecting malicious files based on the actions they perform, as opposed to a signature comparison, and therefore provide a more flexible file checking technique.

Figure 14:
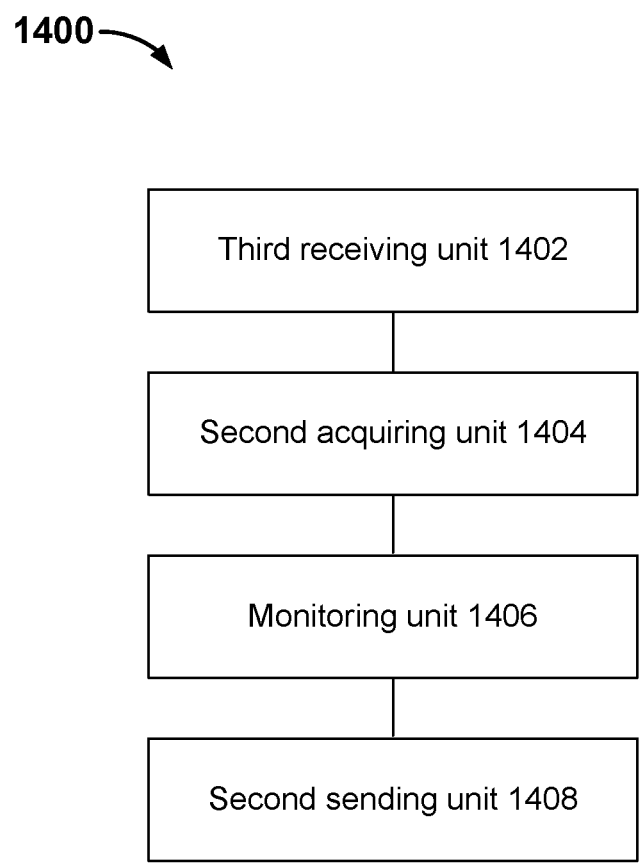
FIG. 14 is a diagram showing an embodiment of a system for detecting malicious files.

FIG. 14 is a diagram showing an embodiment of a system for detecting malicious files. System 1400 includes third receiving unit 1402, second acquiring unit 1404, monitoring unit 1406, and second sending unit 1408. In some embodiments, process 600 of FIG. 6 can be implemented on system 1400. In some embodiments, system 1400 may be implemented at system 100 of FIG. 1.

Third receiving unit 1402 is configured to receive a file checking task from a file checking device. The file checking task comprises at least a storage address of a candidate file and basic information associated with executing the candidate file. Second acquiring unit 1404 is configured to obtain the candidate file using the storage address associated with the candidate file. Monitoring unit 1406 is configured to execute the candidate file based at least in part on the basic information associated with executing the candidate file and generate a monitored action record based at least in part on monitoring the execution of the candidate file. Second sending unit 1408 is configured to send the candidate file to the file checking device. The file checking device is configured to determine a determined set of actions included in the monitored action record that matches one or more action types included in a preset malicious action set and determine whether the candidate file is a malicious file based at least in part on the determined set of actions.

Figure 15:
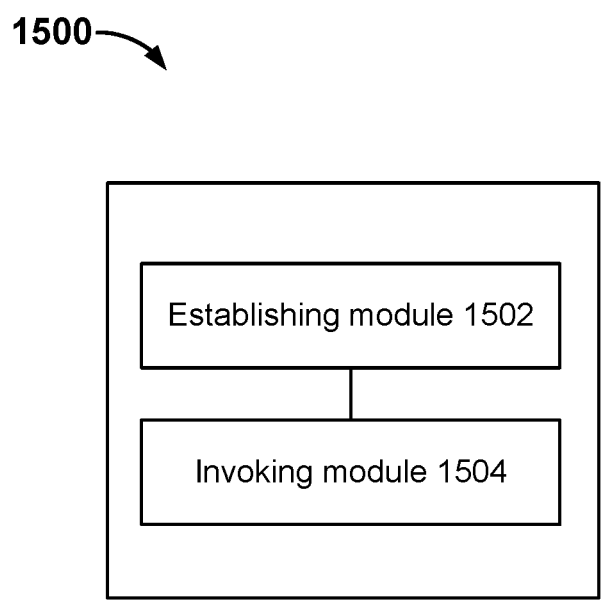
FIG. 15 is a diagram showing an embodiment of a system for executing and monitoring a candidate file.

FIG. 15 is a diagram showing an embodiment of a system for executing and monitoring a candidate file. System 1500 includes establishing module 1502 and invoking module 1504. In some embodiments, process 700 of FIG. 7 can be implemented at system 1500. In some embodiments, monitoring unit 1406 of FIG. 14 can be implemented by system 1500. In some embodiments, system 1500 may be implemented at system 100 of FIG. 1.

Establishing module 1502 is configured to execute a candidate file by at least two virtual machines based at least in part on basic information associated with the candidate file, wherein each virtual machine corresponds to the candidate file. Invoking module 1504 is configured to invoke one or more functions in a preset dynamic link library (DLL) during the execution of the candidate file to monitor the execution of the candidate file and generate a monitored action record corresponding to the execution of the candidate file. In some embodiments, invoking module 1504 is configured to inject a preset DLL into a candidate file in the process of executing each of the candidate files and employ the hook technique to monitor ntdll.dll functions.

Figure 16:
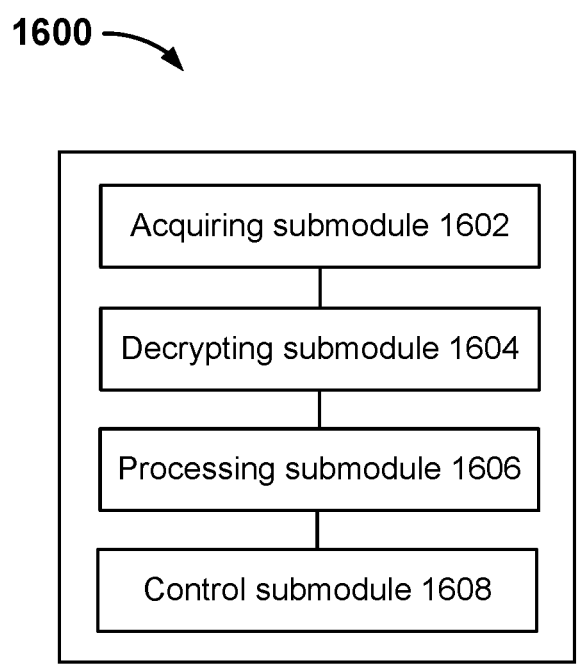
FIG. 16 is a diagram showing an embodiment of a system for executing a candidate file.

FIG. 16 is a diagram showing an embodiment of a system for executing a candidate file. System 1600 includes acquiring submodule 1602, decrypting submodule 1604, a processing submodule 1606, and control submodule 1608. In some embodiments, process 800 of FIG. 8 can be implemented at system 1600. In some embodiments, establishing module 1502 of FIG. 15 can be implemented by system 1600. In some embodiments, system 1600 may be implemented at system 100 of FIG. 1.

Acquiring submodule 1602 is configured to determine a decryption technique for a candidate file that is encrypted. Decrypting submodule 1604 is configured to use the decryption technique to decrypt the candidate file. Processing submodule 1606 is configured to establish virtual environments in at least two virtual machines according to basic information associated with executing the candidate file. Control submodule 1608 is configured to execute the candidate file by each of the at least two virtual machines, wherein the reading and writing operations generated during execution of the candidate file are reset to addresses configured with each virtual machine.

Figure 17:
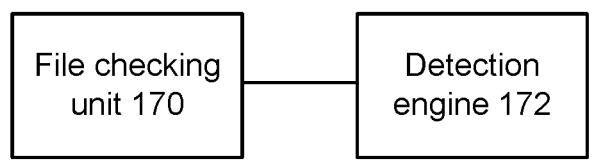
FIG. 17 is a diagram showing an embodiment of a system for detecting malicious files.

FIG. 17 is a diagram showing an embodiment of a system for detecting malicious files. System 1700 includes file checking unit 170 and detection engine 172. In some embodiments, system 1700 may be implemented at system 100 of FIG. 1.

File checking device 170 may be configured to perform process 200 of FIG. 2. Detection device 172 may be configured to perform process 600 of FIG. 6. In some embodiments, a client (not shown in the diagram) collects suspicious files (i.e., candidate files) and sends them through a network to a preprocessing module in file checking device 170. The preprocessing module performs static analysis of the suspicious files to gain basic information on the suspicious files (i.e., basic information for executing the candidate files) and saves the basic information to a database. The preprocessing module then employs an encrypting technique (i.e., an asymmetric algorithm) to encrypt the suspicious files and saves the encrypted, suspicious files to a file server. A dispatching module in the file checking device 170 can then generate file checking tasks. For example, the dispatching module may periodically and proactively generate file checking tasks, or it may generate file checking tasks upon receiving trigger instructions from maintenance personnel. Or the dispatching module may generate file checking tasks upon receiving trigger commands generated by the preprocessing module according to task priority level. Moreover, the dispatching module allocates them to different detection devices. The detection devices obtain encrypted suspicious files from file servers, and they decrypt and execute the suspicious files. The detection devices simultaneously monitor the actions of these suspicious files and generate monitored action records. The monitored action records are transmitted to an analysis module in file checking device 170. The analysis module analyzes the actions in the monitored action records one-by-one in accordance with the malicious action set. Finally, it is determined whether the suspicious files are malicious files.

Optionally, the preprocessing module delivers to the dispatching module: After the suspicious files are submitted by the client, they first pass through the preprocessing module, and then basic information is generated for the dispatching module. The preprocessing module is configured to determine values from the candidate file that are related to md5, sha1, sha256, file extension name, size, decompression, and some specific file information, e.g., assessing the actual format of the file, the type of operating system that is applied, and 32-bit or 64-bit system. In this way, the dispatching module may perform varied dispatching according to the determined basic information. The generated basic information contains the previously mentioned preprocessing results: a filename of the candidate file, an application operating system (e.g., Windows or Linux) in which the candidate file is to be executed, a 32-digit yes/no, a message digest algorithm (MD5), a file size of the candidate file, an SHA1 (secure hash algorithm), an SHA256, a time of submission of the candidate file, an origin of submission, a file type of the candidate file (e.g., indicating whether it is "tfs" or "url" or "oss" or other), and a byte array.

In some embodiments, a dispatching module's transmission to detection devices is as follows: The file checking tasks of the dispatching module are queued. The malicious program queues store the basic information mentioned above, and the corresponding detection devices register with the dispatching module. The dispatching module uses the registration information of the detection devices to learn which queue it should go to in order to obtain candidate files and provides feedback of JSON format information to the detection devices. The JSON format is configurable, and the content source is still the basic information described above. Generally, JSON content includes filename, extension, size, MD5, file internal storage address (tfsname), etc.

The overall structure of the file checking system of the present invention embodiment may be developed using the Java programming language. Since encryption and decryption of candidate files are increased in the system, there is a need to consider performance problems. The use of C/C++ could be used as the module programming language. A checking module involved in process action monitoring could be developed with C language. In addition, asymmetric techniques could be considered as encryption and decryption algorithms. Encryption using an asymmetrical technique might make it impossible to decode even sample files that are intercepted by a third party.

Embodiments of detection of malicious files as described herein provide several advantages, some of which are the following:

(1) Comprehensive file checking

Various embodiments of detecting malicious files as described herein combine static analysis with dynamic analysis. For example, the basic information of a candidate file that is obtained by static analysis is combined with the monitored action record that is generated from dynamic execution of the malicious file, which more comprehensively diagnoses the file.

(2) Efficient file checking

Various embodiments of detecting malicious files as described herein utilize self-designed lightweight virtual machines. Multiple lightweight virtual machines can execute simultaneously on the same physical system platform. That is, lightweight virtual machines can simultaneously check multiple samples and make full use of the physical machine's performance to improve checking efficiency.

(3) High file confidentiality

Various embodiments of detecting malicious files as described herein encrypt and decrypt candidate files in different locations (e.g., database, detection devices). It thus protects the privacy of sample files as required by businesses and/or system administrators.

Overall, various embodiments of detecting malicious files as described herein improve the accuracy of checking for malware over the traditional technique of signature comparison by comparing the actions performed by an executed candidate file to a preset malicious action set, instead of relying on a static signature.

Any one or more of the embodiments described above can also be implemented as computer instructions that are embedded on a computer readable storage medium that is included in a computer program product.

Figure 18:
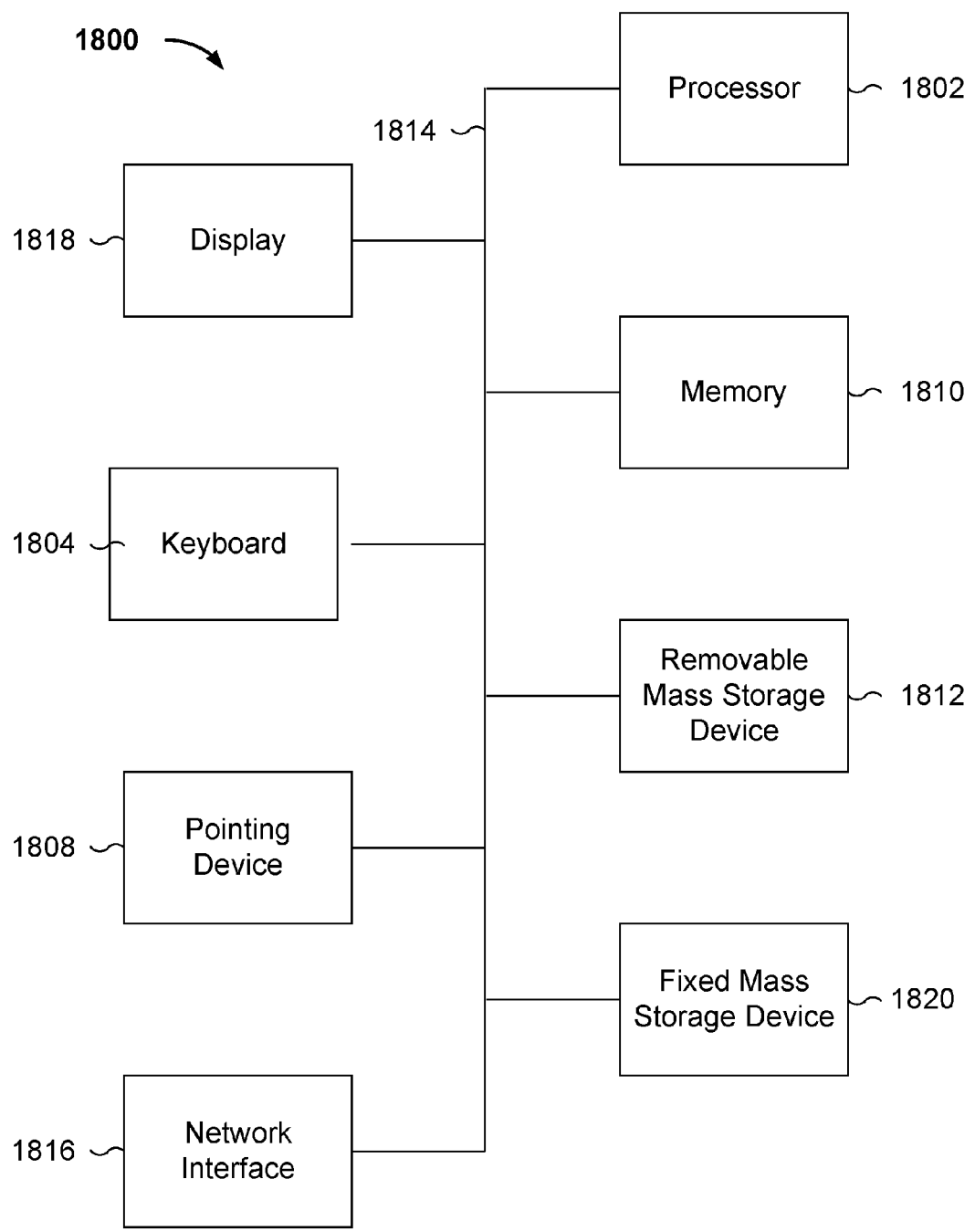
FIG. 18 is a functional diagram illustrating an embodiment of a programmed computer system for detecting malicious files.

FIG. 18 is a functional diagram illustrating an embodiment of a programmed computer system for detecting malicious files. As will be apparent, other computer system architectures and configurations can be used to detect malicious files. Computer system 1800, which includes various subsystems as described below, includes at least one microprocessor subsystem (also referred to as a processor or a central processing unit (CPU)) 1802. For example, processor 1802 can be implemented by a single-chip processor or by multiple processors. In some embodiments, processor 1802 is a general purpose digital processor that controls the operation of the computer system 1800. Using instructions retrieved from memory 1810, the processor 1802 controls the reception and manipulation of input data, and the output and display of data on output devices (e.g., display 1818).

Processor 1802 is coupled bi-directionally with memory 1810, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1802. Also as is well known in the art, primary storage typically includes basic operating instructions, program code, data, and objects used by the processor 1802 to perform its functions (e.g., programmed instructions). For example, memory 1810 can include any suitable computer readable storage media, described below, depending on whether, for example, data access needs to be bi-directional or uni-directional. For example, processor 1802 can also directly and very rapidly retrieve and store frequently needed data in a cache memory (not shown).

A removable mass storage device 1812 provides additional data storage capacity for the computer system 1800 and is coupled either bi-directionally (read/write) or uni-directionally (read only) to processor 1802. For example, storage 1812 can also include computer readable media such as magnetic tape, flash memory, PC-CARDS, portable mass storage devices, holographic storage devices, and other storage devices. A fixed mass storage 1820 can also, for example, provide additional data storage capacity. The most common example of fixed mass storage 1820 is a hard disk drive. Mass storages 1812, 1820 generally store additional programming instructions, data, and the like that typically are not in active use by the processor 1802. It will be appreciated that the information retained within mass storages 1812 and 1820 can be incorporated, if needed, in standard fashion as part of memory 1810 (e.g., RAM) as virtual memory.

In addition to providing processor 1802 access to storage subsystems, bus 1814 can also be used to provide access to other subsystems and devices. As shown, these can include a display 1818, a network interface 1816, a keyboard 1804, and a pointing device 1808, as well as an auxiliary input/output device interface, a sound card, speakers, and other subsystems as needed. For example, the pointing device 1808 can be a mouse, stylus, track ball, or tablet, and is useful for interacting with a graphical user interface.

The network interface 1816 allows processor 1802 to be coupled to another computer, computer network, or telecommunications network using a network connection as shown. For example, through the network interface 1816, the processor 1802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1802 can be used to connect the computer system 1800 to an external network and transfer data according to standard protocols. For example, various process embodiments disclosed herein can be executed on processor 1802, or can be performed across a network such as the Internet, intranet networks, or local area networks, in conjunction with a remote processor that shares a portion of the processing. Additional mass storage devices (not shown) can also be connected to processor 1802 through network interface 1816.

An auxiliary I/O device interface (not shown) can be used in conjunction with computer system 1800. The auxiliary I/O device interface can include general and customized interfaces that allow the processor 1802 to send and, more typically, receive data from other devices such as microphones, touch-sensitive displays, transducer card readers, tape readers, voice or handwriting recognizers, biometrics readers, cameras, portable mass storage devices, and other computers.

Please understand that, in several embodiments provided by the present application, the disclosed order information-processing device may be realized in other ways. The device embodiments described above are merely illustrative. For example, the division into the units is merely a division by logical function. When actually implemented, there may be other forms of division. For example, multiple units or components may be combined or integrated into another system, or some features might be omitted or not executed. In addition, the interposed couplings or direct couplings or communication connections that are displayed or discussed may be indirect couplings or communication links that pass through some interfaces, units, or modules. They may be electrical or may take another form.

The units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

Furthermore, the functional units in the various embodiments of the present invention can be integrated into one processing unit, or each unit can have an independent physical existence, or two or more units can be integrated into a single unit. The above integrated units may also take the form of hardware, and they may take the form of software functional units.

If the integrated units are realized in the form of software functional units and are sold or used as separate products, they may be stored on computer-readable storage media. Based on such an understanding, the technical scheme of the present invention, whether intrinsically or with respect to portions that contribute to the prior art, or with respect to all or part of the technical scheme, is realizable in the form of software products. These computer software products can be stored on storage media (such as ROM/RAM, magnetic disks, and optical disks) and include a certain number of commands used to cause a piece of terminal equipment (which could be a mobile phone, a computer, a server, or network equipment) to execute the methods described in the embodiments of the present invention. The storage medium described above encompasses: USB flash drive, mobile hard drive, read-only memory (ROM), random access memory (RAM), portable hard drives, magnetic disks, optical disks, or various other media that can store program code.

The description above is only a specific means of implementing the present invention. It should be pointed out that persons with ordinary skill in the art can, without departing from the principles of the present invention, also produce a number of improvements and embellishments, and that such improvements and embellishments should also be regarded as falling within the scope of protection of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a candidate file from a client;
obtaining a basic information associated with the candidate file through analyzing the candidate file;
encrypting the candidate file;
storing the basic information associated with the candidate file to a database and storing the encrypted candidate file to a file server;
receiving a file checking task, wherein the file checking task comprises a storage address of the candidate file and the basic information associated with executing the candidate file;
sending the file checking task to a detection device, wherein the file checking task causes the detection device to:
use the storage address to acquire the candidate file from the file server;
execute the candidate file based at least in part on the basic information associated with the candidate file;
monitor the execution of the candidate file; and
generate a monitored action record corresponding to the execution of the candidate file;
receiving the monitored action record from the detection device, wherein the monitored action record comprises an action associated with one or more of the following: a file creation function, a file deletion function, an information changing function, a registration table creation function, and a registration table value setting function;
determining a set of actions included in the monitored action record that matches one or more action types included in a preset malicious action set; and
determining whether the candidate file is a malicious file based at least in part on the determined set of actions.

2. The method of claim 1, further comprising generating the preset malicious action set, including by:
creating a first training sample set and a second training sample set, wherein the first training sample set comprises a plurality of malicious sample files and the second training sample set comprises a plurality of not malicious sample files;
executing the first training sample set to generate a first sample action record and executing the second training sample set to generate a second sample action record;
determining a corresponding occurrence frequency for each action type in the first sample action record and in the second sample action record;
generating a first sample action set based on a first preset occurrence frequency threshold value and a second sample action set based on a second preset occurrence frequency threshold value, wherein the first sample action set comprises one or more action types included in the first sample action record whose corresponding occurrence frequencies are greater than the first preset occurrence frequency threshold value, and wherein the second sample action set comprises one or more action types included in the second sample action record whose corresponding occurrence frequencies are greater than the second preset occurrence frequency threshold value; and
determining the preset malicious action set based at least in part on the first sample action set and the second sample action set.

3. The method of claim 1, further comprising generating the preset malicious action set, including by:
creating a first training sample set and a second training sample set, wherein the first training sample set comprises a plurality of malicious sample files and the second training sample set comprises a plurality of not malicious sample files;
executing the first training sample set to generate a first sample action record and executing the second training sample set to generate a second sample action record;
determining a corresponding occurrence frequency for each action type in the first sample action record and in the second sample action record;
generating a first sample action set based on a first preset occurrence frequency threshold value and a second sample action set based on a second preset occurrence frequency threshold value, wherein the first sample action set comprises one or more action types included in the first sample action record whose corresponding occurrence frequencies are greater than the first preset occurrence frequency threshold value, and wherein the second sample action set comprises one or more action types included in the second sample action record whose corresponding occurrence frequencies are greater than the second preset occurrence frequency threshold value; and
determining the preset malicious action set based at least in part on the first sample action set and the second sample action set, wherein determining the preset malicious action set based at least in part on the first sample action set and the second sample action set comprises:
performing a set intersection operation on the first sample action set and the second sample action set to obtain a third sample action set, wherein the third sample action set comprises one or more action types that are included in both the first sample action set and the second sample action set; and
deleting one or more action types from the first sample action set that match an action type included in the third sample action set to obtain the preset malicious action set.

4. The method of claim 1, wherein the candidate file is encrypted with an asymmetrical encryption technique.

5. The method of claim 1, wherein determining whether the candidate file is the malicious file based at least in part on the determined set of actions comprises determining whether matching malicious actions included in the determined set of actions exceeds a preset malicious action threshold value.

6. A computer program product, the computer program product being embodied in a non-transitory computer readable storage medium and comprising computer instructions for:
receiving a candidate file from a client;
obtaining a basic information associated with the candidate file through analyzing the candidate file;
encrypting the candidate file;
storing the basic information associated with the candidate file to a database and storing the encrypted candidate file to a file server;

receiving a file checking task, wherein the file checking task comprises at least a storage address of the candidate file and the basic information associated with executing the candidate file;

sending the file checking task to a detection device, wherein the file checking task causes the detection device to:
- use the storage address to acquire the candidate file from the file server;
- execute the candidate file based at least in part on the basic information associated with the candidate file;
- monitor the execution of the candidate file; and
- generate a monitored action record corresponding to the execution of the candidate file;

receiving the monitored action record from the detection device, wherein the monitored action record comprises an action associated with one or more of the following: a file creation function, a file deletion function, an information changing function, a registration table creation function, and a registration table value setting function;

determining a set of actions included in the monitored action record that matches one or more action types included in a preset malicious action set; and determining whether the candidate file is a malicious file based at least in part on the determined set of actions.

7. The computer program product of claim 6, further comprising generating the preset malicious action set, including by:

creating a first training sample set and a second training sample set, wherein the first training sample set comprises a plurality of malicious sample files and the second training sample set comprises a plurality of not malicious sample files;

executing the first training sample set to generate a first sample action record and executing the second training sample set to generate a second sample action record;

determining a corresponding occurrence frequency for each action type in the first sample action record and in the second sample action record;

generating a first sample action set based on a first preset occurrence frequency threshold value and a second sample action set based on a second preset occurrence frequency threshold value, wherein the first sample action set comprises one or more action types included in the first sample action record whose corresponding occurrence frequencies are greater than the first preset occurrence frequency threshold value, and wherein the second sample action set comprises one or more action types included in the second sample action record whose corresponding occurrence frequencies are greater than the second preset occurrence frequency threshold value; and determining the preset malicious action set based at least in part on the first sample action set and the second sample action set.

8. The computer program product of claim 6, further comprising generating the preset malicious action set, including by:

creating a first training sample set and a second training sample set, wherein the first training sample set comprises a plurality of malicious sample files and the second training sample set comprises a plurality of not malicious sample files;

executing the first training sample set to generate a first sample action record and executing the second training sample set to generate a second sample action record;

determining a corresponding occurrence frequency for each action type in the first sample action record and in the second sample action record;

generating a first sample action set based on a first preset occurrence frequency threshold value and a second sample action set based on a second preset occurrence frequency threshold value, wherein the first sample action set comprises one or more action types included in the first sample action record whose corresponding occurrence frequencies are greater than the first preset occurrence frequency threshold value, and wherein the second sample action set comprises one or more action types included in the second sample action record whose corresponding occurrence frequencies are greater than the second preset occurrence frequency threshold value; and determining the preset malicious action set based at least in part on the first sample action set and the second sample action set, wherein determining the preset malicious action set based at least in part on the first sample action set and the second sample action set comprises:
- performing a set intersection operation on the first sample action set and the second sample action set to obtain a third sample action set, wherein the third sample action set comprises one or more action types that are included in both the first sample action set and the second sample action set; and
- deleting one or more action types from the first sample action set that match an action type included in the third sample action set to obtain the preset malicious action set.

9. The computer program product of claim 6, wherein the candidate file is encrypted with an asymmetrical encryption technique.

10. The computer program product of claim 6, wherein determining whether the candidate file is the malicious file based at least in part on the determined set of actions comprises determining whether matching malicious actions included in the determined set of actions exceeds a preset malicious action threshold value.

11. A method, comprising:

receiving a candidate file from a client;

obtaining a basic information associated with the candidate file through analyzing the candidate file;

encrypting the candidate file;

storing the basic information associated with the candidate file to a database and storing the encrypted candidate file to a file server;

receiving a file checking task from a file checking device, wherein the file checking task comprises at least a storage address of the candidate file and the basic information associated with executing the candidate file;

obtaining the candidate file using the storage address associated with the candidate file;

executing the candidate file based at least in part on the basic information associated with executing the candidate file;

generating a monitored action record based at least in part on monitoring the execution of the candidate file, wherein the monitored action record comprises an action associated with one or more of the following: a file creation function, a file deletion function, an information changing function, a registration table creation function, and a registration table value setting function; and sending the candidate file to the file checking device, wherein receipt of the candidate file causes the file checking device to:
  determine a determined set of actions included in the monitored action record that matches one or more action types included in a preset malicious action set; and
  determine whether the candidate file is a malicious file based at least in part on the determined set of actions.

12. The method of claim 11, wherein generating the monitored action record based at least in part on monitoring the execution of the candidate file comprises:
  executing the candidate file by at least two virtual machines based at least in part on the basic information associated with executing the candidate file, wherein each virtual machine corresponds to the candidate file; and
  invoking one or more functions in a preset dynamic link library (DLL) during the execution of the candidate file to monitor the execution of the candidate file and generate the monitored action record corresponding to the execution of the candidate file.

13. The method of claim 11, wherein generating the monitored action record based at least in part on monitoring the execution of the candidate file comprises:
  executing the candidate file by at least two virtual machines based at least in part on the basic information associated with executing the candidate file, wherein each virtual machine corresponds to the candidate file, wherein each virtual machine that corresponds to the candidate file comprises:
  determining a decryption technique for the candidate file that is encrypted;
  using the decryption technique to decrypt the candidate file;
  establishing virtual runtime environments in the at least two virtual machines according to the basic information associated with executing the candidate file; and
  executing the candidate file by each of the at least two virtual machines, wherein reading and writing operations generated during execution of the candidate file are reset to a corresponding address configured with each virtual machine; and
  invoking one or more functions in a preset dynamic link library (DLL) during the execution of the candidate file to monitor the execution of the candidate file and generate the monitored action record corresponding to the execution of the candidate file.

14. The method of claim 11, wherein the candidate file is obtained from a file server that is identified at least in part by the storage address.

15. The method of claim 11, wherein the candidate file is encrypted with an asymmetrical encryption technique.

* * * * *